July 5, 1938.  M. L. ECKMAN  2,122,933
WELDING APPARATUS
Filed April 7, 1937  2 Sheets-Sheet 1

INVENTOR.
Meril L. Eckman
BY Bates, Golrick & Teare
ATTORNEYS.

Patented July 5, 1938

2,122,933

UNITED STATES PATENT OFFICE 2,122,933

WELDING APPARATUS

Meril L. Eckman, Cleveland, Ohio, assignor to The American Coach & Body Company, Cleveland, Ohio, a corporation of Ohio Application April 7, 1937, Serial No. 135,513

5 Claims. (Cl. 219—4)

This invention relates to a machine for electrical welding, and particularly to a machine in which one effective electrode is adjustable manually for contact with the work. The principal object is to provide a simple and effective means for enabling relatively small articles of manufacture to be welded rapidly and in various places as by "spot" or "line" welds. A specific object is to provide an improved electrode support for a welding machine of the type indicated.

Other objects include the provision of an improvement in controls for welding current; an improved means to support work and to supply welding current thereto in a large number of positions; an improved means to govern the angle of approach between the electrode and work while permitting great variation in initial placement of work on the support, and an improved and more effective and economical arrangement of parts in a welding means.

Other objects and features of the invention will become apparent from the following description relating to the accompanying drawings, which show the preferred form. The essential characteristics are summarized in the claims.

Ordinarily, welding machines of the general type shown are so arranged that the effective electrodes operate always in substantially the same relationship to each other,—as permanently aligned. The work is held in suitable holders or directly by hand and has to be shifted once for each welding operation. In the welding of small articles considerable time is wasted either in mounting work in such holders or in bringing the work properly into contact with both electrodes. In the present arrangement the welding can be effected with greater rapidity, principally by reason of providing for supporting the work directly by one electrode in various positions on it, this permitting a large number of small articles to be placed ready for welding, and the other electrode is arranged to be easily shifted manually to contact with the work, irrespective of its position on the supporting electrode.

Figure 1:
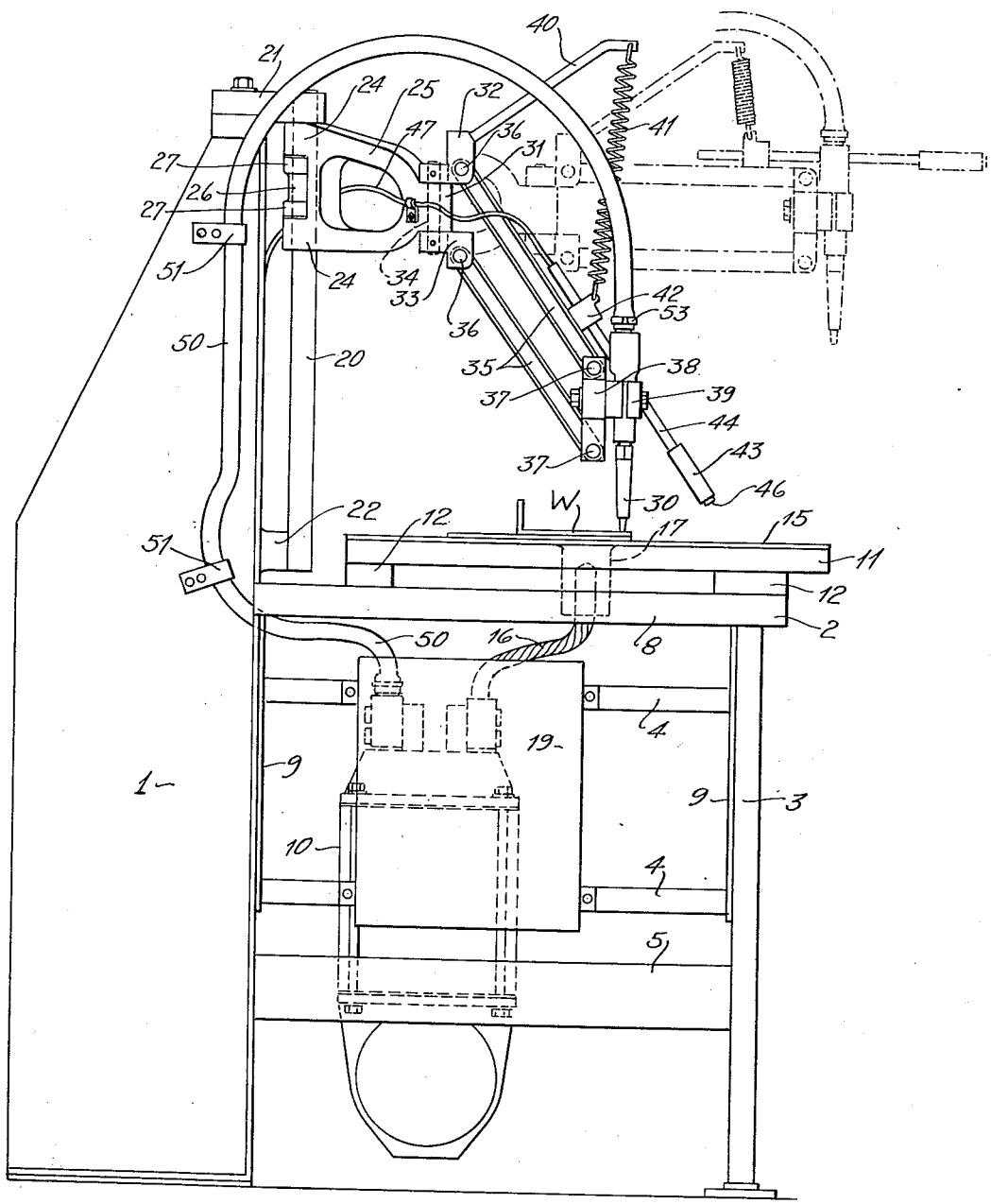
Figure 2:
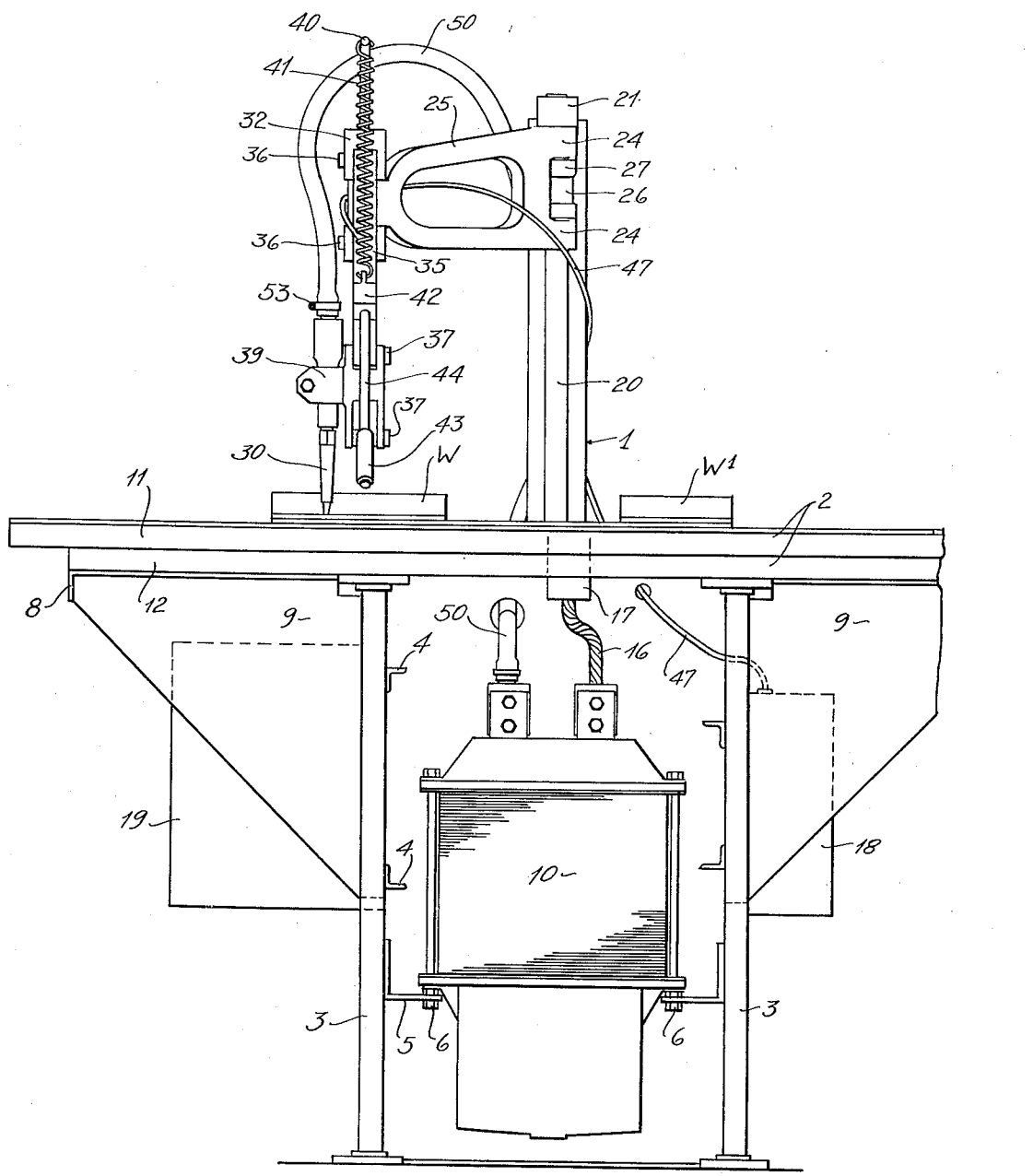

In the drawings, Fig. 1 is a side elevation of the machine, and Fig. 2 is a front elevation thereof.

Referring further to the drawings, 1 indicates a rear upright portion of the frame, to which is suitably attached a table construction, indicated generally at 2, having forwardly positioned legs 3. The legs may be connected to the upright frame member as by angles 4, and 5. The latter angles have flanges extending horizontally toward each other, for rigid connection, as at 6, to a transformer unit 10 of conventional type, situated directly beneath the table, as shown particularly in Fig. 2. The transformer frame thus cooperates with the angles 5, for cross-bracing the legs.

The table construction may comprise a thick panel 11 (as of planking) supported as on stringers 12, which extend across the upper angle members 8 of the top construction. Additional support for the table may comprise gussets 9, secured to the upright frame and to the legs in suitable fashion. The top panel 11 supports one effective electrode (the fixed one) comprising, for example, a copper plate 15, which may extend entirely across and for the full length of the panel 11. One terminal 16 of the secondary of the transformer, may be connected to the fixed electrode as through a depending boss 17, attached to the bottom side of said electrode.

As shown in Fig. 2, a contactor unit 18 is supported as on the framework 3 and 4, beneath the table at one side, and a timer unit 19 is similarly supported on the opposite side of the frame. These units may be of the usual construction, and so arranged that the contactor unit is controlled by hand, as with a switch, to be later described, and this, in turn through a suitable relay, renders the timer initially effective to supply current to both electrodes.

Work to be welded may be placed anywhere on top of the table,—for instance, as illustrated by workpieces W, and W1 (representing flat plates and angles to be welded thereto), said plates resting flatwise for electrical contact with the electrode 15.

Referring to the upper portion of the machine a shaft or column 20 is supported in upright position, parallel to the front face of the upright frame member 1, as on brackets 21 and 22. The upper portion of the column 20 is circular and is embraced by aligned apertured ear portions 24, of a sub-frame or arm 25. The arm is supported in fixed position on the column as by a fixed collar 26, having friction reducing spacers 27 (e. g. ball bearings), on each end of it, abutting respective ears 24. The arm may be swung freely over the table from side to side.

The arm or sub-frame 25 forms a strong support for the movable electrode, indicated at 30, and the latter is so mounted that it may partake of raising and lowering movement in order to bring it into and out of contact with the work, and also of movement lengthwise and transversely of the table, i. e. plate 15, so that work on any portion of the support may be reached effectively for welding.

To the above ends, I have shown a reduced portion 31 at the outer end of the arm, and brackets 32 and 33 bearing on the opposite (upper and lower) faces of the reduced portion. The brackets 32 and 33 are rigidly connected together as by a pin 34, passing through and turnable freely in a vertical opening in said arm portion 31. A parallel linkage mechanism, similar to that of a pantograph, comprising arms 35, pivoted as at 36, to respective brackets 32 and 33, and similarly pivoted as at 37, to a rigid bracket member 38, supports the shank portion of the electrode 30 as by a laterally extending clamp 39.

In order automatically to elevate the parallel linkage mechanism, including the electrode mounting, from its lowered or operating position, the bracket 32 may carry an arm 40, having a tension spring 41 depending therefrom and having its lower end suitably secured to the mechanism, as at a block 42 on the upper link. The spring normally maintains the mechanism in the position of it shown in broken lines in Fig. 1.

To adjust the linkage mechanism and electrode 30 there is provided a handle 43, secured as by a tube 44, to the upper link 35, the tube extending through an opening in the block 42, as shown. The handle and its supporting tube 44 are preferably at one side of the electrode, as the operator faces the work (see Fig. 2). The outer end of the handle may carry a push button 46 of an electric switch which is connected as by a cable 47, running through the tube, and suitably secured to the frame parts of the machine, so that it leads to the contactor box 18. This, as mentioned above, controls the timer 19 through a suitable relay. When the button is pressed the relay and timer apparatus goes into affect to turn on the welding current. Current may be supplied from the secondary of the transformer 10 to the electrode 30, as by a flexible cable 15, attached as by brackets 51 to the upright 1, and then looping freely above the sub-frame 25 and the linkage mechanism, thus extending downwardly for attachment, as at 53, to the upper end of the electrode 30, without interfering with the free movement of the electrode supporting mechanism in positioning the electrode in contact with the work, anywhere on the table. The operator is enabled readily to accomplish adjustment of such electrode by means of the handle 43. When the operator grasps the handle 43 he may, as will be seen, operate the switch button with his finger. Welding current, as mentioned above, is turned off automatically by the apparatus in the timer box 19, so that the welding period for each (e. g. spot-weld) will be controlled in a manner not to damage the work.

I claim:—

1. In electrical welding equipment, the combination of a fixed electrode, a support for said fixed electrode, an arm swingable on said support in a horizontal plane, a pair of pivotally interconnected parallel links attached to the free end portion of the arm and swingable relative thereto in a vertical plane, and a movable electrode carried by the free ends of said links and movable universally with respect to said fixed electrode.

2. In an electrical welding apparatus of the type having a fixed electrode and a movable electrode, the combination comprising a frame, a vertically disposed column supported thereby, a sub-frame pivotally supported by said column for movement in a plane at right angles to the axis of the column, a bracket pivotally supported from the free end of the sub-frame for movement in a plane at right angles to the axis of the column, a movable electrode, a second bracket adapted to securely hold said movable electrode, parallel linkage pivotally connecting the respective brackets to permit movement of the movable electrode in a plane parallel with the axis of said column, a fixed work support on the frame having a relatively large work supporting surface constituting a fixed electrode, and a handle secured to and carried by the parallel linkage, whereby the movable electrode can be universally moved with respect to work supported by the fixed electrode, such universal movement being obtained entirely by the plurality of pivotal connections specified.

3. In an electrical welding apparatus of the type having a fixed electrode and a movable electrode, the combination comprising a frame, a work-support on the frame having a relatively large work supporting surface and constituting the fixed electrode, a sub-frame pivotally mounted for movement in a plane parallel with the work supporting surface of said fixed electrode, parallel linkage, a pair of brackets pivotally attached to respective ends of said linkage, one of said brackets being pivotally connected to and supported by the sub-frame for movement in a plane parallel to the work-supporting surface of the fixed electrode, and the other of said brackets rigidly supporting the movable electrode, and a manually controlled handle for moving said parallel linkage, brackets and sub-frame, respectively, to simultaneously impart vertical and horizontal movement to the movable electrode across the work supporting surface of the fixed electrode.

4. In electrical welding apparatus of the type having a main frame which supports a fixed electrode, supplied with a relatively large work supporting surface, and a movable electrode, in combination with means for supporting the movable electrode for universal movement, comprising the combination of a sub-frame mounted for swinging movement in a plane parallel with the work supporting surface of the fixed electrode, a parallel linkage device connected to the sub-frame for pivoted movement in a plane parallel to the surface of the fixed electrode and at right angles thereto, means pivotally connected to said linkage for rigidly supporting the movable electrode, and manually operated means movable with the linkage to impart universal movement to said movable electrode relative to the work supporting surface of said fixed electrode.

5. In electrical welding apparatus, the combination comprising a frame, a vertically disposed column supported thereby, a sub-frame pivotally supported by said column for movement in a plane at right angles to the axis of the column, means pivotally supported from the free end of the sub-frame for movement in a plane at right angles to the axis of the column, a movable electrode, means to support said movable electrode, parallel linkage pivotally connecting the first and second-named means to permit movement of the movable electrode in a plane parallel with the axis of said column, a work support on the frame having a relatively large work supporting surface and constituting a fixed electrode, and manual means secured to and carried by the parallel linkage, whereby the movable electrode can be universally moved with respect to work supported by the fixed electrode.

MERIL L. ECKMAN.